United States Patent Office 2,898,237
Patented Aug. 4, 1959

2,898,237

HEAT-SEALABLE POLYETHYLENE TEREPHTHALATE FILM AND PROCESS

David Ivan Sapper, Buffalo, N.Y., assignor to E. I. du Pont de Nemours and Company, Wilmington, Del., a corporation of Delaware No Drawing. Application September 16, 1957
Serial No. 683,926

16 Claims. (Cl. 117—138.8)

This invention relates to heat-sealable packaging films and more particularly, to films of polyethylene terephthalate having at least one surface coated with a novel, adherent, heat-sealable coating composition and to the process for producing such coated films.

Polyethylene terephthalate films, more particularly polyethylene terephthalate films which have been oriented to substantially the same degree in both directions by stretching and/or rolling followed by heating the film at a constant length to set it in the oriented condition, by reason of their superior tensile strength, durability, low permeability to oxygen and carbon dioxide, high gloss and transparency, find great utility in such applications as protective coverings, glass replacement, electrical insulation, etc. Its application, however, for certain packaging uses, has been severely limited due to the difficulty in heat-sealing this material both to itself and other materials. Polyethylene terephthalate films cannot be satisfactorily heat-sealed by ordinary commercial methods because of severe film shrinkage at the high temperatures (235°–240° C.) found necessary for the heat-sealing of the polyethylene terephthalate film. Attempts have heretofore been made to modify these films with a view to overcoming this difficulty. Such attempts have not generally been successful primarily for the reason that improved heat-sealability has been achieved at the expense of other desirable properties, e.g., durability, moistureproofness, transparency, gloss, clarity, slip, electrostatic propensity, etc., of the film.

An object of this invention, therefore, is to provide a process for preparing coated poleythylene terephthalate film having enhanced heat-seal characteristics. Another object is to provide oriented, heat-set polyethylene terephthalate film with an adherent, continuous coating which enhances the heat-seal characteristics of the film without impairment of the desirable properties of the film. Still another object is to provide a coated, oriented, heat-set polyethylene terephthalate film which is heat-sealable at relatively low temperatures. The foregoing and other objects will more clearly appear hereinatfer.

These objects are realized by the present invention which, briefly stated, comprises coating at least one surface of a polyethylene terephthalate film with an aqueous dispersion coating composition comprising (1) from 65% to 99% by weight, based on the total weight of solids in the composition, of an interpolymer prepared by polymerizing a monomer mixture comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile, (2) from 0% to 35% of polyvinyl chloride, (3) from 0% to 35% of ammonium rosinate, and (4) from 0% to 35% of a wax selected from the group consisting of paraffin and microcrystalline waxes, the sum of constituents (1), (2), (3) and (4) being 100%, and thereafter drying the coated film whereby to form a continuous, adherent coating on said film which is satisfactorily heat-sealable at temperatures as low as 120° C.

As indicated hereinabove, the advantages of this invention are more fully realized when the base film is one that has been oriented to substantially the same extent in both directions and heat-set; e.g., a polyethylene terephthalate which has been stretched in both the machine and transverse directions to about 3 times its original dimensions, and thereafter heat-set by holding the oriented film under tension while subjecting it to a temperature of 150°–200° C. Such film constitutes the preferred base film to be coated, and the invention will be described hereinafter with specific reference to such film.

The interpolymer constituent of the coating composition may be prepared by any of the conventional aqueous dispersion polymerization methods; employing catalyst systems customarily used in the preparation of aqueous dispersions of interpolymer from monomers, including alkali persulfates, and organic peroxides to which may be added polyalkylene polyamines, ferrous gluconate, etc. The usual modifying agents for diene polymerization, such as dodecyl mercaptan and diisopropyl xanthogen disulfide, may also be added to the reaction mixture. Aqueous dispersions (latexes) of interpolymers of butadiene, acrylonitrile, and styrene resulting from the polymerization of monomer mixtures within the ranges above specified are also commercially available. Preferably the alkyl substituents of the alpha- or nuclear-substituted styrene should contain not more than 3 carbon atoms. For optimum results, the ultimate particle size [1] of the interpolymer constituent of the coating should be within the range of from 0.01 to 1.0 micron.

By varying the combination and weight ratio of the specified solids of the coating composition, the desired degree of heat-sealability, slip and durability of seals for a variety of end uses for these coated films can be obtained. The polyvinyl chloride and/or ammonium rosinate and/or wax constituents may be directly incorporated into the interpolymer latex in the form of an aqueous dispersion or emulsion. The dispersion and emulsions used for the coatings characteristic of this process are for the most part those which are sold commercially.

The polyvinyl chloride, either in the form of a powder ("Geon" 121—B. F. Goodrich Co.) dispersed in an aqueous medium or in the form of a latex type dispersion ("Geon" 351—B. F. Goodrich Co.), may be added in concentrations up to 35% by weight of the total solids content of the coating composition. The ultimate particle size of the polyvinyl particles should range from 0.10 to 5 microns.

Ammonium rosinate ("Dresinol" 42, 155, 205, 215—Hercules Powder Co.) alone or in combination with paraffin or microcrystalline wax such as "Aristowax" (a highly refined paraffin wax, melting point 61° C.—Petroleum Specialties Co.), or "Ceremul" A, C or X (paraffin and microcrystalline wax emulsions—Socony-Mobil Oil Co.), may also be directly incorporated into the interpolymer latex in the form of an aqueous emulsion. The ultimate particle size of these constituents should range from 0.50 to 3 microns.

The advantages of this invention are substantially realized by as little as 2 grams of coating (dry basis) per square meter of base film. On the other hand, coating thicknesses in excess of 30 grams of coating per square meter of base film do not appear to yield further improvements in the heat-sealability of the film. For

---

[1] Ultimate particle size: In certain dispersions the individual particles have a tendency to form agglomerates. The term ultimate particle size refers to the size of the smallest individual particle.

ease of application, the solids content of the liquid coating composition should range from 20 to 60% by weight, based on the total weight of the composition.

The following examples will serve to further illustrate the principles and practice of the present invention. Percentage compositions are by weight unless otherwise indicated.

In the following examples, 4½" wide, 0.0005" thick oriented (stretched 3× in both direction), heat-set (at 200° C.) polyethylene terephthalate film samples were coated on a conventional type coating tower operated at a rate of 9–10 feet/minute. The aqueous dispersion consisting of the interpolymer latex and the additives, i.e., polyvinyl chloride and/or ammonium rosinate and/or wax, which had been directly incorporated into the interpolymer latex in the form of a dispersion or an emulsion (aqueous) was placed in a dip tank maintained at room temperature. The percentages of solids in the coating dispersion ranged from about 38%–40%, which yielded coating weights approximating 10 grams per square meter without excessively close clearances between the doctoring apparatus. These coating dispersions were doctored onto the film and the film was then dried by means of air heated to 100°–130° C. The coating weights, heat-seal strength, slip and seal durability were determined as follows:

Coating weight was determined by immersing the sample of coated film in cyclohexanone to entirely dissolve the coating; rinsing in ethyl acetate; drying overnight at room temperature at 35% relative humidity. The sample was weighed before and after this treatment to determine the coating weight.

Heat-seal strength was measured by cutting a piece of the coated film 4" x 10" with the grain running in the long direction into two pieces 4" x 5". The two pieces were superimposed so that the opposite surfaces were in contact. The two pieces of superimposed film were then sealed together at each end at right angles to the grain. A ¾" wide sealing bar heated to a temperature of 160° C. at 20 p.s.i. pressure contacted the ends for 2 seconds. The sealed sheets were then cut in half at right angles to the grain. From the center of the 4 resulting pieces, 1½" wide strips parallel to the grain were cut. The 4 sets of strips were then conditioned for one day at 75° F. and 35% relative humidity. They were tested by opening each set of strips at the free ends, placing them in the Suter testing machine and pulling them apart. The highest force in grams required to pull the strips apart was taken as a measure of the heat-seal bond strength.

Slip was measured manually and rated according to the following standards:

Excellent to good: No amount of pressure exerted on two film surfaces held together between thumb and forefinger was sufficient to prevent the two surfaces from slipping over each other under a tangential force.

Fair: Two film surfaces would slide past each other only when moderate pressure is exerted normal to the film surfaces.

Poor: No matter how lightly two film surfaces were held together, they did not slip past each other under a tangential force.

Heat-seal durability was measured by an accelerated durability test, the "rice bag drop" test. The rice bags were made by folding a 4" x 15" sheet of the coated film and sealing the film along the two edges with the bar type heat-sealer described previously. After 100 grams of rice were put in the bag, the opened end was sealed with the same type of heat-sealer. This leaves a small but uniform amount of free space above the rice. The bags measured 4" x 6.5", outside dimensions, and 3" x 5", inside dimensions. The bags were conditioned overnight at 75° F. and 35% relative humidity, or 0° F. and 35% relative humidity as indicated in the table. The test consisted in releasing the bag from a fixed clamp which was 2 feet above the floor of a porcelain tray. The bags were held by the end seal and were allowed to drop onto the non-seal bottom edge. The number of falls survived before loss of rice occurs from any type of failure was taken as a measure of durability.

In the manner described hereinbefore, oriented heat-set polyethylene terephthalate film was coated with aqueous dispersions of interpolymer, and one or more of the additives, i.e., polyvinyl chloride, ammonium rosinate and wax, in varying concentrations. The coating formulations, coating weight, heat-seal strength, slip and heat-seal durability are listed in the table. For purposes of comparison, Example 1 is an untreated, oriented, heat-set polyethylene terephthalate (control) film, and Example 2 is coated with 100% aqueous dispersion of "Hycar" 1577.

*Table*

| Example | Coating Formulation | Coating Weight (g./m.²) | Heat-Seal Strength (g./1½") at 35% RH | Slip | Seal Durability (drops before peeling open) | |
|---|---|---|---|---|---|---|
| | | | | | 75° F. | 0° F. |
| 1 | None (uncoated, oriented polyethylene terephthalate film). | | 0 | | 0 | 0 |
| 2 | 100% "Hycar" 1577 [1] | 9.4 | 730 | Poor | 7 | 10 |
| 3 | 98.75% "Hycar" 1577, 1.25% "Geon" 121 [2] | 12.0 | 765 | Good | | |
| 4 | 97.5% "Hycar" 1577, 2.5% "Geon" 121 | 5.0 | 230 | Excellent | | |
| 5 | 65.0% "Hycar" 1577, 35.0% "Geon" 351 [3] | 8.7 | 170 | Good | | |
| 6 | 79.95% "Hycar" 1577, 18.80% "Geon" 351, 1.25% "Geon" 121 | 10.3 | 250 | do | 6 | 8 |
| 7 | 78.8% "Hycar" 1577, 18.7% "Geon" 351, 2.5% "Geon" 121 | 12.8 | 370 | do | | |
| 8 | 81.0% "Hycar" 1577, 18.5% "Geon" 351, 0.4% "Geon" 121 | 12.3 | 430 | do | | |
| 9 | 80.5% "Hycar" 1577, 18.5% "Geon" 351, 1.0% "Geon" 121 | 14.0 | 325 | do | | |
| 10 | 92.0% "Hycar" 1577, 8.0% "Geon" 351 | 8.1 | 330 | Fair | | |
| 11 | 99.0% "Hycar" 1577, 1.0% "Geon" 121 | 14.0 | 530 | do | | |
| 12 | 80.5% "Hycar" 1577, 19.5% "Geon" 351 | 12.8 | 415 | do | | |
| 13 | 97.75% "Hycar" 1577, 3.0% "Aristowax" [4], 1.25% "Geon" 121 | 15.5 | 785 | Excellent | | |

Table—Continued

| Example | Coating Formulation | Coating Weight (g./m.²) | Heat-Seal Strength (g./1½") at 35% RH | Slip | Seal Durability (drops before peeling open) 75° F. | Seal Durability (drops before peeling open) 0° F. |
|---|---|---|---|---|---|---|
| 14 | 89.3% "Hycar" 1577<br>7.6% "Dresinol" 42 [5]<br>3.1% "Aristowax" | 4.5 | 380 | Fair | 7 | 7 |
| 15 | 89.3% "Hycar" 1577<br>7.6% "Dresinol" 205<br>3.1% "Aristowax" | 3.4 | 580 | do | 8 | 6 |
| 16 | 89.3% "Hycar" 1577<br>7.6% "Dresinol" 155<br>3.1% "Aristowax" | 4.7 | 345 | Excellent | 5 | 4 |
| 17 | 89.3% "Hycar" 1577<br>7.6% "Dresinol" 155<br>3.1% "Aristowax" | 4.7 | 345 | do | 6 | |
| 18 | 90.8% "Hycar" 1577<br>6.4% "Dresinol" 155<br>2.8% "Ceremul" C [6] | 8.0 | 430 | do | | |
| 19 | 90.8% "Hycar" 1577<br>6.4% "Dresinol" 155<br>2.8% "Ceremul" X | 11.3 | 570 | Good | | |
| 20 | 90.8% "Hycar" 1577<br>2.8% "Ceremul" A<br>6.4% "Dresinol" 155 | 9.6 | 540 | Excellent | 6 | 6 |
| 21 | 97.0% "Hycar" 1577<br>3.0% "Ceremul" A | 11.0 | 665 | Good | | |

[1] "Hycar" 1577—butadiene-acrylonitrile/styrene copolymer (described in USP 2,791,571).
[2] "Geon" 121—polyvinyl chloride powder—B. F. Goodrich Co.
[3] "Geon" 351—polyvinyl chloride dispersion—B. F. Goodrich Co.
[4] "Aristowax"—highly refined paraffin wax (M.P. 61° C.)—Petroleum Specialties Inc.
[5] "Dresinol" 42, 155, 205—ammonium rosinates—Hercules Powder Co.
[6] "Ceremul" A, C — paraffin and microcrystalline wax emulsions—Socony-Mobil Oil Co.

From the foregoing table, it can be seen that heat-sealable, oriented, heat-set polyethylene terephthalate films possessing satisfactory slip properties and seal durability are obtained by utilizing the above-described coating formulations. By varying the type and concentration of additives incorporated in the butadiene/acrylonitrile copolymer resin mixtures, the heat-seal strength and slip properties may be adjusted to the particular end use desired for the film.

The present invention affords a simple, inexpensive method for producing heat-sealable, oriented, heat-set polyethylene terephthalate film which has acceptable slip properties and seal durability. The coating formulations characterized by this process allow for a wide range of heat-sealable films to be prepared which fits the need for many end uses. The coated films of this invention are not only particularly useful as general packaging materials, but also in such other uses wherever it is necessary to join such films together.

I claim:

1. A process for improving the heat-sealability of oriented, heat-set polyethylene terephthalate film which comprises coating at least one surface of said film with an aqueous dispersion coating composition comprising (1) from 65% to 99% by weight, based on the total weight of solids in the composition, of particles of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile, (2) from 0% to 35% of polyvinyl chloride particles, (3) from 0% to 35% of ammonium rosinate particles and (4) from 0% to 35% of a wax selected from the group consisting of paraffin and microcrystalline waxes, the sum of constituents (1), (2), (3) and (4) being 100%, and thereafter drying the coated film.

2. The process of claim 1 wherein the interpolymer is an interpolymer of butadiene-1,3, styrene and acrylonitrile.

3. A process for improving the heat-sealability of oriented, heat-set polyethylene terephthalate film which comprises coating at least one surface of said film with an aqueous dispersion coating composition comprising (1) from 65% to 99% by wieght, based on the total weight of solids in the composition, of particles of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile, and (2) from 1% to 35% of polyvinyl chloride particles the sum of constituents (1) and (2) being 100%, and thereafter drying the coated film.

4. The process of claim 3 wherein the interpolymer is an interpolymer of butadiene-1,3, styrene and acrylonitrile.

5. A process for improving the heat-sealability of oriented, heat-set polyethylene terephthalate film which comprises coating at least one surface of said film with an aqueous dispersion coating composition comprising (1) from 90% to 91% by weight, based on the total weight of solids in the composition, of particles of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile, (2) from 6% to 7% of ammonium rosinate, and (3) from 2% to 3% of paraffin wax, the sum of constituents (1), (2) and (3) being 100%, and thereafter drying the coated film.

6. The process of claim 5 wherein the interpolymer is an interpolymer of butadiene-1,3, styrene and acrylonitrile.

7. A process for improving the heat-sealability of oriented, heat-set polyethylene terephthalate film which comprises coating at least one surface of said film with an aqueous dispersion coating composition comprising (1) 97% by weight, based on the total weight of solids in the composition, of particles of an interpolymer prepared by polymerzing a mixture of monomers comprising essentially from about 34% to about 38% by weight of butadiene-1,3, from about 29% to about 39% of a monomer selected from the group consisting of styrene and alpha- and nuclear substituted alkyl and chlorostyrenes, and from about 27% to about 33% of acrylonitrile, and (2) 3% of paraffin wax, the sum of constituents (1) and (2) being 100%, and thereafter drying the coated film.

8. The process of claim 7 wherein the interpolymer is an interpolymer of butadiene-1,3, styrene and acrylonitrile.

9. An oriented, heat-set polyethylene terephthalate film having on one surface at least a continuous, adherent coating comprising essentially (1) from about 65% to 99% by weight, based on the total weight of the coating, of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile, (2) from 0% to 35% of polyvinyl chloride, (3) from 0% to 35% of ammonium rosinate and (4) from 0% to 35% of a wax selected from the group consisting of paraffin and microcrystalline waxes, the sum of constituents (1), (2), (3) and (4) being 100%.

10. The product of claim 9 wherein the interpolymer is an interpolymer of butadiene-1,3, styrene and acrylonitrile.

11. An oriented, heat-set polyethylene terephthalate film having on one surface at least a continuous, adherent coating comprising essentially (1) from about 65% to 99% by weight, based on the total weight of the coating, of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile and (2) from 1% to 35% of polyvinyl chloride, the sum of constituents (1) and (2) being 100%.

12. The product of claim 11 wherein the interpolymer is an interpolymer of butadiene-1,3, styrene and acrylonitrile.

13. An oriented, heat-set polyethylene terephthalate film having on one surface at least a continuous, adherent coating comprising essentially (1) from 90% to 91% by weight, based on the total weight of the coating, of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile, (2) from 6% to 7% of ammonium rosinate and (3) from 2% to 3% of paraffin wax, the sum of constituents (1), (2) and (3) being 100%.

14. The product of claim 13 wherein the interpolymer is an interpolymer of butadiene-1,3, styrene and acrylonitrile.

15. An oriented, heat-set polyethylene terephthalate film having on one surface at least a continuous, adherent coating comprising essentially (1) 97% by weight, based on the total weight of the coating, of an interpolymer prepared by polymerizing a mixture of monomers comprising essentially from about 34% to about 38% by weight of butadiene-1,3, from about 29% to about 39% of a monomer selected from the group consisting of styrene and alpha- and nuclear-substituted alkyl and chlorostyrenes, and from about 27% to about 33% of acrylonitrile and (2) 3% of paraffin wax, the sum of constituents (1) and (2) being 100%.

16. The product of claim 15 wherein the interpolymer is an interpolymer of butadiene-1,3, styrene and acrylonitrile.

References Cited in the file of this patent

UNITED STATES PATENTS

| | | |
|---|---|---|
| 2,678,285 | Browning | May 11, 1954 |
| 2,714,562 | Hechtman | Aug. 2, 1955 |
| 2,762,720 | Michel | Sept. 11, 1956 |
| 2,808,347 | Blatz | Oct. 1, 1957 |

UNITED STATES PATENT OFFICE
CERTIFICATE OF CORRECTION

Patent No. 2,898,237                                                 August 4, 1959

David Ivan Sapper

It is hereby certified that error appears in the printed specification of the above numbered patent requiring correction and that the said Letters Patent should read as corrected below.

Column 1, line 54, for "hereinatfer" read -- hereinafter --; column 3, line 9, for "direction" read -- directions --; columns 3 and 4, in the table, first item opposite "Example 13", for '97.75% "Hycar" 1577---' read -- 95.75% "Hycar" 1577 --- --; columns 5 and 6, below the table, footnote 6, for '"Ceremul" A, C—paraffin and microcrystalline wax emulsions—Socony-Mobil Oil Co.', read -- "Ceremul" A, C, X—paraffin and microcrystalline wax emulsions—Socony-Mobil Oil Co. --; column 6, line 30, for "wieght" read -- weight --.

Signed and sealed this 5th day of January 1960.

(SEAL)
Attest:

KARL H. AXLINE                                             ROBERT C. WATSON
Attesting Officer                                       Commissioner of Patents